United States Patent
Dudley et al.

(10) Patent No.: US 8,126,943 B2
(45) Date of Patent: Feb. 28, 2012

(54) AUTONOMIC VIRTUAL LOG CONFIGURATION

(75) Inventors: John Gary Dudley, Raleigh, NC (US); Neeraj Joshi, Morrisville, NC (US); David M. Ogle, Cary, NC (US); Balan Subramanian, Morrisville, NC (US); Brad Byer Topol, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2166 days.

(21) Appl. No.: 10/914,692

(22) Filed: Aug. 9, 2004

(65) Prior Publication Data
US 2006/0036601 A1   Feb. 16, 2006

(51) Int. Cl.
*G06F 17/30* (2006.01)
(52) U.S. Cl. ......................... 707/828; 707/831
(58) Field of Classification Search .............. 714/54, 714/26; 709/318; 370/401; 707/8, 1, 694, 707/709, 776, 751, 783, 828, 831
See application file for complete search history.

(56) References Cited

U.S. PATENT DOCUMENTS
5,924,096 A   7/1999   Draper et al.
(Continued)

*Primary Examiner* — Charles Rones
*Assistant Examiner* — Fariborz Khoshnoodi
(74) *Attorney, Agent, or Firm* — Steven M. Greenberg, Esq.; Carey, Rodriguez, Greenberg & O'Keefe

(57) ABSTRACT

A method, system and apparatus for autonomically configuring a virtual log. In accordance with the present invention, events flowing into the virtual log can be heuristically processed to determine if any events have been lost. When an event is considered to have been lost, the size of the log associated with the event can be increased. Also, the interval in which the virtual log interacts with the associated log can be decreased so as to ensure that the events will not continue to be lost. When a period of time has elapsed during which no events are heuristically determined to have been lost, either or both of the interval and associated log can be adjusted so as to increase the interval and decrease the size of the associated log.

20 Claims, 2 Drawing Sheets

U.S. PATENT DOCUMENTS

| | | |
|---|---|---|
| 6,618,822 B1 | 9/2003 | Loaiza et al. |
| 2002/0062403 A1* | 5/2002 | Burnett et al. ................ 709/318 |
| 2002/0146018 A1* | 10/2002 | Kailamaki et al. ............ 370/401 |
| 2003/0200163 A1 | 10/2003 | O'Riordan et al. |
| 2003/0225585 A1 | 12/2003 | Miller et al. |
| 2003/0226058 A1 | 12/2003 | Miller et al. |
| 2003/0233385 A1* | 12/2003 | Srinivasa et al. .................. 709/1 |
| 2003/0233389 A1 | 12/2003 | Bradshaw et al. |
| 2005/0015685 A1* | 1/2005 | Yamamoto ..................... 714/54 |
| 2005/0210331 A1* | 9/2005 | Connelly et al. ................ 714/26 |

* cited by examiner

AUTONOMIC VIRTUAL LOG CONFIGURATION

BACKGROUND OF THE INVENTION

1. Statement of the Technical Field

The present invention relates to systems logging and more particularly to the aggregation of log data in a virtual log.

2. Description of the Related Art

Diagnostics forms a critical foundation for the successful operation of a computing system. System elements ranging from individual processes within a computing application to the hardware devices which support the operation of the computing application each can produce volumes of log data. Using the log data, systems analysts, or even automated processes, can analyze the operation of the system for performance monitoring and problem determination and remediation. Accordingly, the production and storage of log data can fulfill an important role in the management of a computing system.

For many decades, individual computing applications and components have been configured to generate log data, particularly in an effort to track the execution progress of the application and the operational performance of the components. The advent and commercial utilization of widespread computing networks, including the global Internet, have encouraged the componentization and distribution of computing applications and systems elements. As a result, tracking the log data for each distributed system element can be burdensome if not impossible.

To facilitate the management of a distributed set of logs produced by a disparate arrangement of systems elements, the virtual log has been developed as a tool for aggregating the log data from a heterogeneous collection of systems elements. As an example, in United States Patent Application Publication US 2003/0226058 published on Dec. 4, 2003 by Thomas Jay Miller et al. for VIRTUAL LOGGING SYSTEM AND METHOD, a common transactional logging system is proposed that presents to one or more log clients the appearance that each log client is interacting with a dedicating logging system. In reality, however, the virtual logging system is multiplexing multiple virtual log streams, including log records, for each log client into a single transactional log. Moreover, the Miller transactional logging system does not account for the different native formats, and particularly the heterogeneous mechanisms used by different logging sources, in performing the logging. The problem of heterogeneous mechanisms will be recognized as a more complex issue than merely that of different logging sources requiring a single abstract representation to consumers.

To track the operation of a computing system through the use of a virtual log, the individual logs of the various and sundry elements of the system can be combined into a single, virtual log. While it appears that combining information from a set of log files in a distributed arrangement into a single virtual log ought to be a straightforward operation, it is not always so as the skilled artisan will recognize. Specifically, log files can be limited in size in a configurable manner. Where a log file is size-limited, the log file may wrap upon itself. This requires an external entity to keep track of which records have already been processed and which records are yet to processed because snapshots of the real log may provide events that have already been processed during the previous processing cycle. Tracking the state of log records in a wrapping log file can be difficult in nature and, when performed improperly, can result in a loss of log data. Of course, where a log file is too large, computing resources will have been wasted.

Given the vast size of the individual logs, a comprehensive real-time aggregation of individual log files into a virtual log can be resource consumptive beyond that which is reasonable. Accordingly, virtual logging systems can periodically sample the logs of each of the individual products. Yet, to establish a sampling interval which is too long, temporally speaking, can result in the repeated wrappings of individual log files causing a loss of data. In contrast, if the sampling interval is set too short, limited computing resources can be unnecessarily wasted in furtherance of a diagnostic goal at the expense of the operation of the computing system.

Whereas optimally configuring a virtual log can be problematic generally, in an autonomic system, the problem can be particularly acute. For the uninitiated, autonomic computing systems self-regulate, self-repair and respond to changing conditions, without requiring any conscious effort on the part of the computing system operator. To that end, the computing system itself can bear the responsibility of coping with its own complexity. The crux of autonomic computing relates to eight principal characteristics:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.

Thus, in keeping with the principles of autonomic computing, it would be preferred if a virtual log could configure and reconfigure itself under varying and unpredictable conditions. Also, it would be preferred if a virtual log never settled for the status quo and always looked for ways to optimize its workings. It would be further preferred if a virtual log could self-heal and recover from routine and extraordinary events that might cause some of its parts to malfunction. It would be yet further preferred if a virtual log could know its environment and the context surrounding its activity, and act accordingly. Finally, it would be even yet further preferred if a virtual log could anticipate the optimized resources needed while keeping its complexity hidden from the user.

SUMMARY OF THE INVENTION

The present invention addresses the deficiencies of the art in respect to logging and provides a novel and non-obvious method, system and apparatus for autonomically configuring virtual logs. A method for autonomically configuring a virtual logging system can include aggregating within a virtual log, one or more logged events originating from different computing logs in a computing system. Optionally, the different computing logs can be produced by different logging mechanisms and the different computing logs can be converted into a format able to be processed within the virtual log. The method further can include detecting a missed event from one of the computing logs. Finally, responsive to the detection, the method can include re-configuring either or both of a log interval for performing the aggregating step, and a log size of the one of the computing logs.

In a preferred aspect of the invention, the aggregating step can include periodically reading and processing log events written to each of the computing logs according to the log interval; and, writing the log events to the virtual log. Also, in the preferred embodiment, the detecting step can include applying heuristics to detect the missed event. Specifically, the heuristics can include determining that an expected event had not been read from a particular one of the computing logs as had been expected within a threshold period time.

Preferably, the reconfiguration step can include exponentially increasing the log size of the one of the computing logs. The increasing step can be limited to a maximum log size, however. The reconfiguration step also can include decreasing the log interval to an interval which is inversely proportional to a number of computing cycles available for use by the virtual logging system. As before, though, the decreasing can be limited to a minimum interval. In any event, the detection can be ignored if the detection is determined not to have exceeded a deviation threshold. Notwithstanding, the detection needn't be ignored if the detection had been ignored previously for a threshold number of times. Finally, if an event has not been missed for a threshold period of time, either or both of the log interval and the log size can be re-configured by either or both increasing the log interval and decreasing the log size, for example in a linear fashion.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for autonomically configuring a virtual log. In accordance with the present invention, events flowing into the virtual log can be heuristically processed to determine if any events have been lost. When an event is considered to have been lost, the size of the log associated with the event can be increased. Also, the interval in which the virtual log interacts with the associated log can be decreased so as to ensure that the events will not continue to be lost. When a period of time has elapsed during which no events are heuristically determined to have been lost, either or both of the interval and associated log can be adjusted so as to increase the interval and decrease the size of the associated log.

Figure 1:
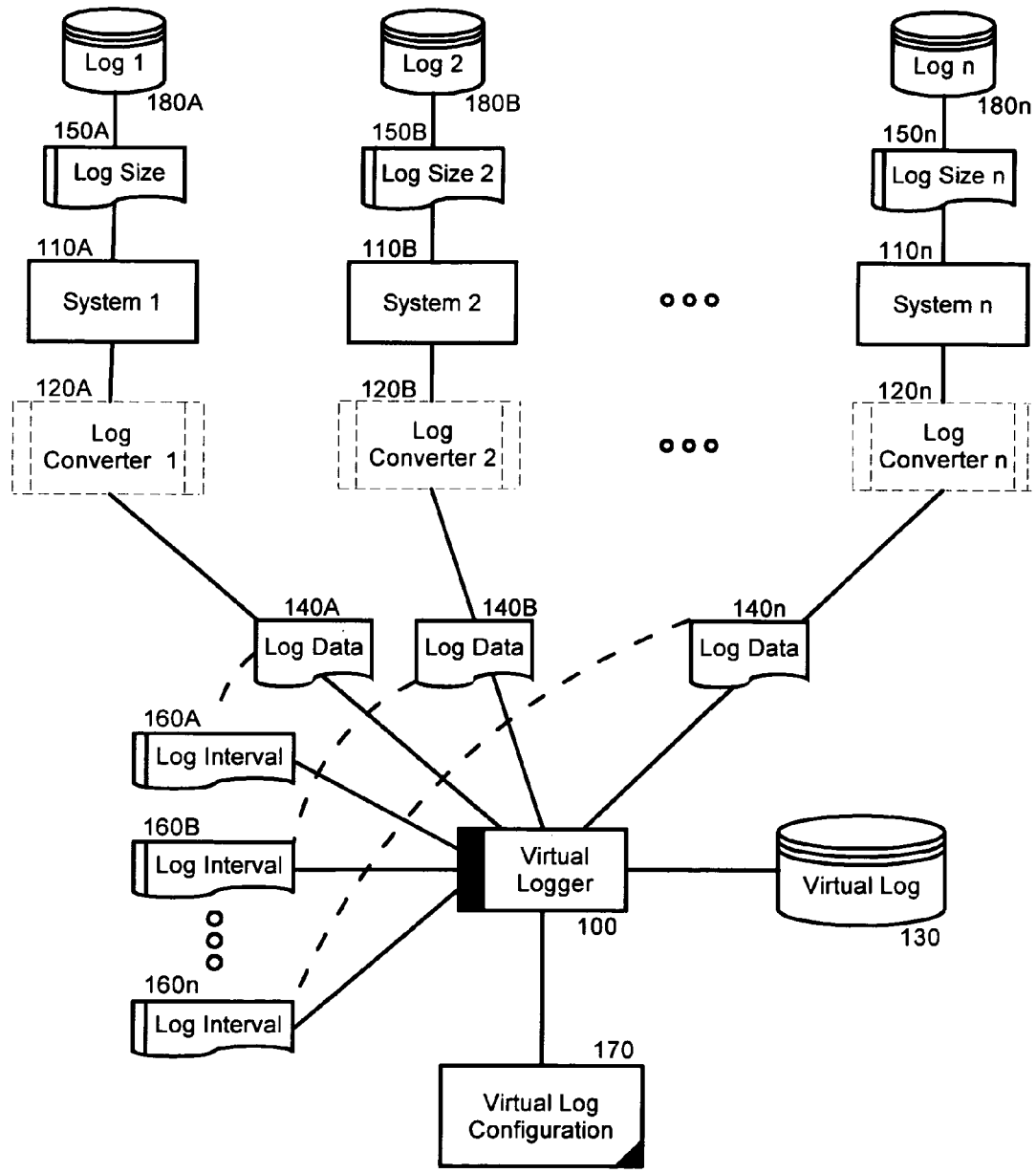
FIG. 1 is schematic illustration of a virtual logging system configured for autonomic virtual log configuration; and, FIG. 2 is a flow chart illustrating a process for autonomically configuring a virtual log in the virtual logging system of FIG. 1.

In further illustration of a preferred aspect of the present invention, FIG. 1 is schematic illustration of a virtual logging system configured for autonomic virtual log configuration. The virtual logging system can include a virtual logger 100 coupled to a virtual log 130. The virtual logger 100 can be configured to receive log data 140A, 140B, 140n from one or more remote logs 180A, 180B, 180n associated with one or more remote systems 110A, 110B, 110n. In this regard, the remote systems 110A, 110B, 110n can include applications processes, hardware devices, communications devices and the like. As such, each of the remote systems 110A, 110B, 110n can write event data relating to the operation of the remote systems 110A, 110B, 110n to respective ones of the remote logs 180A, 180B, 180n.

Importantly, each of the remote logs 180A, 180B, 180n can be configured to have a specific log size 150A, 150B, 150n. Consequently, when the event data written to any one of the remote logs 180A, 180B, 180n exceeds the corresponding log size 150A, 150B, 150n, the remote logs 180A, 180B, 180n can "wrap", overwriting the oldest entries in the respective one of the remote logs 180A, 180B, 180n. In any case, periodically according to an established log interval 160A, 160B, 160n, the virtual logger 100 can receive or retrieve the log data 140A, 140B, 140n from the corresponding remote systems. Optionally, where one or more of the remote logs 180A, 180B, 180n store data in a format that cannot be read natively by the virtual logger 100, one or more log converters 120A, 120B, 120n can convert the log data 140A, 140B, 140n to a format which can be processed by the virtual logger 100.

The virtual logger 100 can be configured to aggregate the log data 140A, 140B, 140n in the virtual log 130 as it is received or retrieved accordingly to the corresponding log intervals 160A, 160B, 160n. Importantly, the aggregation of the log data 140A, 140B, 140n can be monitored and controlled by the virtual log configuration process 170. The virtual log configuration process 170 can apply heuristics to the log data 140A, 140B, 140n to determine when events occurring within the remote systems 110A, 110B, 110n have been missed and have not been received as part of the log data 140A, 140B, 140n. Exemplary heuristics can include the detection of a heartbeat type event, such as an event which is known to occur with a certain degree of frequency. When the heartbeat type event is not logged within a defined period of time, it can be concluded that the log sizes 150A, 150B, 150n of the remote logs 180A, 180B, 180n, the log intervals 160A, 160B, 160n, or both log sizes and log intervals ought to be adjusted to ensure that no further events are missed.

Figure 2:
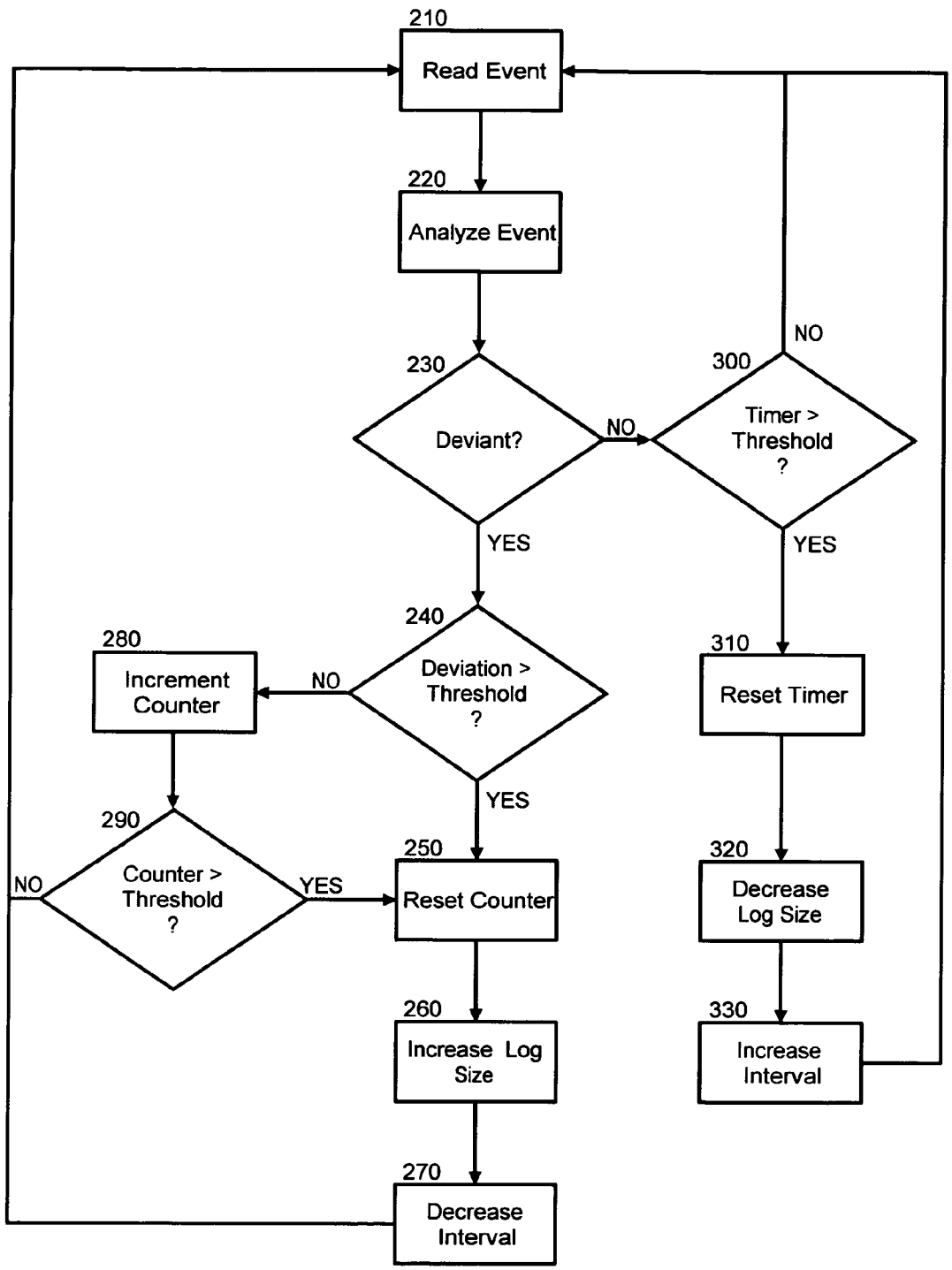

In more particular explanation, FIG. 2 is a flow chart illustrating a process for autonomically configuring a virtual log in the virtual logging system of FIG. 1. Beginning in block 210, an event can be read which had been produced in a remote log associated with a remote system. In block 220, the event can be analyzed according to pre-established heuristics. Exemplary heuristics can include whether a period of time has elapsed during which a particular expected log entry has not been detected in an event received from the remote log. Subsequently, in block 230 it can be determined if the heuristics have detected a deviant condition.

Notwithstanding, some deviation can be permitted so as to avoid a hysterisis condition. Accordingly, in decision block 240, it can be determined if the nature of the deviation exceeds a threshold such that a re-configuration of the virtual logging system will be required. If not, a counter can be incremented in block 280. If, in decision block 290 it is determined that the counter has exceeded a threshold, thereby negating the acceptance of the deviant condition, in block 250 the counter can be reset and remedial measures can be undertaken through a re-configuration of the virtual logging system.

Specifically, in block 260 the log size of the remote log can be increased, preferably in an exponential manner. Also, in block 270 the log interval can be reduced, preferably in a manner which is inversely proportional to the number of computing cycles available for use by the virtual logging system. Optionally, in the case of the enlargement of the remote log size, the exponential increase can be limited to a maximum value so as to not cause the run-away enlargement of the remote log. Similarly, in the case of the reduction of the log interval, the reduction can be limited to a minimum interval so as to not cause the run-away reduction of the log interval. In any case, once the remedial re-configuration of the virtual logging system has completed, the process can return to block 210 and begin anew.

Notably, if in decision block 230 it is determined that the event is not deviant, in decision block 300 it further can be determined whether sufficient time has passed since a deviant event so as to justify an optimizing re-configuration of the virtual logging system. If so, in block 310 the timer can be reset and in block 320 the log size of the remote log can be decreased. Similarly, in block 330 the log interval can be increased. Preferably, the decrease in log size can be a linear decrease in log size and the increase in the log interval can be inversely proportional to the number of computing cycles available for use by the virtual logging system.

Thus, in keeping with the principles of autonomic computing, the method, system and apparatus of the present invention provides for a virtual logging system which can configure and reconfigure itself under varying and unpredictable conditions. Also, the virtual logging system of the present invention does not settle for the status quo and always looks for ways to optimize its workings. The virtual logging system of the present invention further self-heals and recovers from routine and extraordinary events that might cause some of its parts to malfunction. The virtual logging system of the present invention yet further knows its environment and the context surrounding its activity, and acts accordingly. Finally, the virtual logging system of the present invention even yet further anticipates the optimized resources needed while keeping its complexity hidden from the user.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for autonomically configuring a virtual logging system comprising the steps of:
    aggregating within a virtual log, a plurality of logged events originating from different computing logs generated through different logging mechanisms in a computing system;
    detecting a missed event from one of said computing logs; and,
    responsive to said detection, re-configuring at least one of a log interval for performing said aggregating step, and a log size of said one of said computing logs.

2. The method of claim 1, wherein said aggregating step comprises the steps of:
    periodically reading and processing log events written to each of said computing logs according to said log interval; and,
    writing said log events to said virtual log.

3. The method of claim 1, wherein said detecting step comprises the step of applying heuristics to detect said missed event.

4. The method of claim 3, wherein said heuristics comprise the step of determining that an expected event had not been read from a particular one of said computing logs as had been expected within a threshold period time.

5. The method of claim 1, wherein said reconfiguration step comprises the step of exponentially increasing said log size of said one of said computing logs.

6. The method of claim 5, further comprising the step of limiting said increasing step to a maximum log size.

7. The method of claim 1, wherein said reconfiguration step comprises the step of decreasing said log interval to an interval which is inversely proportional to a number of computing cycles available for use by the virtual logging system.

8. The method of claim 7, further comprising the step of limiting said decreasing to a minimum interval.

9. The method of claim 1, further comprising the step of ignoring said detection if said detection is determined not to have exceeded a deviation threshold, but not ignoring said detection if said detection had been ignored previously for a threshold number of times.

10. The method of claim 1, further comprising the step of, if an event has not been missed for a threshold period of time, re-configuring at least one of a log interval for performing said aggregating step by increasing said log interval, and a log size of said one of said computing logs by decreasing said log size.

11. A machine readable storage having stored thereon a computer program for autonomically configuring a virtual logging system, the computer program comprising a routine set of instructions which when executed by a machine cause the machine to perform the steps of:
    aggregating within a virtual log, a plurality of logged events originating from different computing logs in a computing system;
    detecting a missed event from one of said computing logs; and, responsive to said detection, re-configuring at least one of a log interval for performing said aggregating step, and a log size of said one of said computing logs.

12. The machine readable storage of claim 11, wherein said aggregating step comprises the steps of:
periodically reading and processing log events written to each of said computing logs according to said log interval,
writing said log events to said virtual log.

13. The machine readable storage of claim 11, wherein said detecting step comprises the step of applying heuristics to detect said missed event.

14. The machine readable storage of claim 13, wherein said heuristics comprise the step of determining that an expected event had not been read from a particular one of said computing logs as had been expected within a threshold period time.

15. The machine readable storage of claim 11, wherein said reconfiguration step comprises the step of exponentially increasing said log size of said one of said computing logs.

16. The machine readable storage of claim 15, further comprising a routine set of instructions which when executed by the machine cause the machine to further perform the step of limiting said increasing step to a maximum log size.

17. The machine readable storage of claim 11, wherein said reconfiguration step comprises the step of decreasing said log interval to an interval which is inversely proportional to a number of computing cycles available for use by the virtual logging system.

18. The machine readable storage of claim 17, further comprising a routine set of instructions which when executed by the machine cause the machine to further perform the step of limiting said decreasing to a minimum interval.

19. The machine readable storage of claim 11, further comprising a routine set of instructions which when executed by the machine cause the machine to further perform the step of ignoring said detection if said detection is determined not to have exceeded a deviation threshold, but not ignoring said detection if said detection had been ignored previously for a threshold number of times.

20. The machine readable storage of claim 11, further comprising a routine set of instructions which when executed by the machine cause the machine to further perform the step of, if an event has not been missed for a threshold period of time, re-configuring at least one of a log interval for performing said aggregating step by increasing said log interval, and a log size of said one of said computing logs by decreasing said log size.

* * * * *